3,368,907
PROCESS FOR PREPARING BONE STOCK

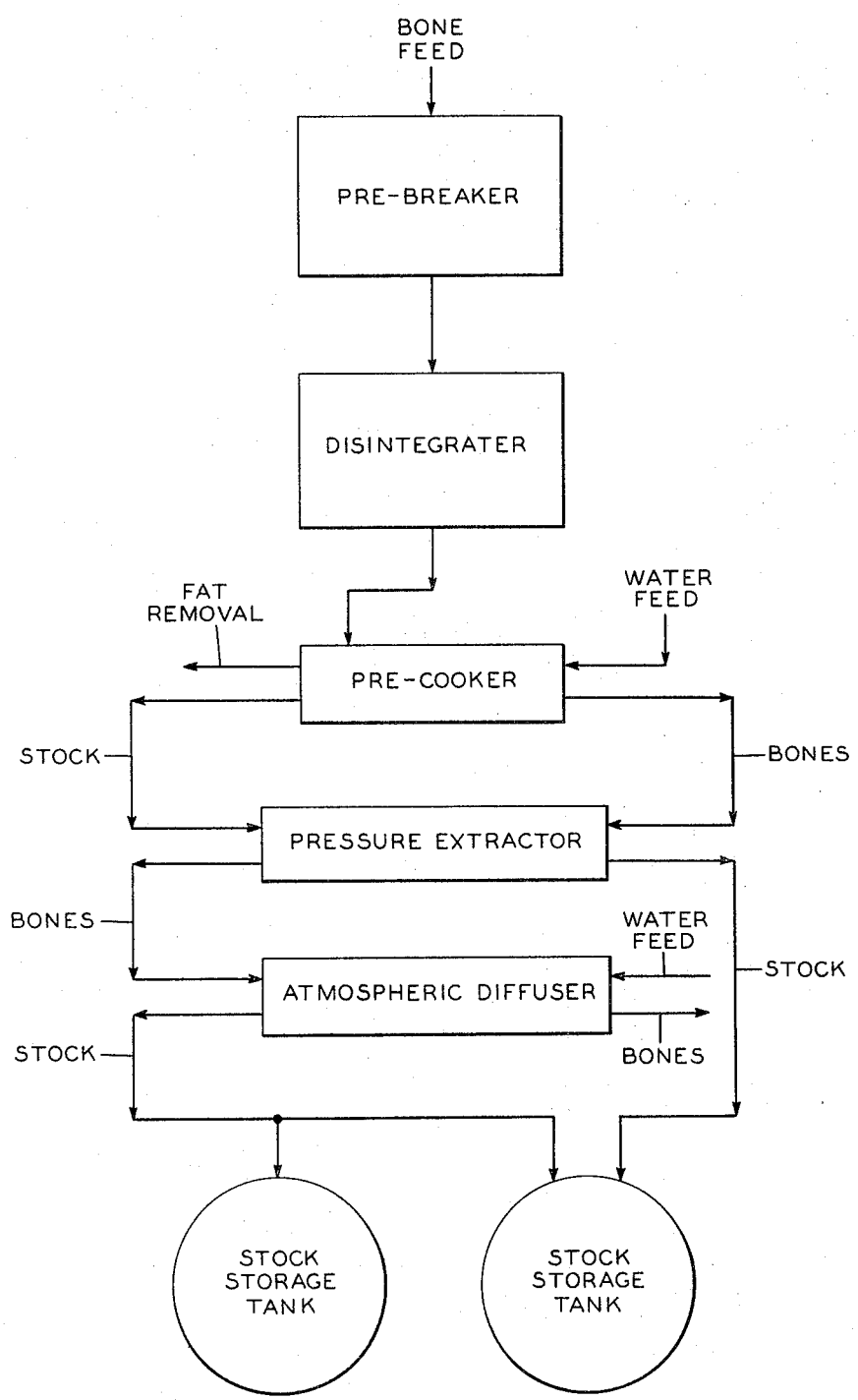

Ralph A. Miller, Cherry Hill, N.J., assignor to Campbell Soup Company, Camden, N.J., a corporation of New Jersey Filed Sept. 10, 1964, Ser. No. 395,502
16 Claims. (Cl. 99—110)

ABSTRACT OF THE DISCLOSURE

A process for preparing flavoring stock from bones that includes the steps of feeding ground bones and water into a container; heating the bones in water in the container for about 15 minutes at a temperature of about 210° F.; skimming fat from the heated liquid; placing the bones in skimmed liquid under pressure and heating the bones and skimmed liquid, while under pressure, to a temperature of about 300° F. for about 30 to 45 minutes; releasing the pressure and removing the liquid; feeding fresh water to the remaining bones; heating the fresh water and remaining bones for about 30 to 60 minutes at a temperature of about 200° to 210° F. and thereafter, separating the bones and liquid.

---

This invention relates to the rendering of bones and more particularly, to the preparation of flavoring broth or stock from such bones.

In the preparation of soups, stews, broths and various food products having a meat flavor, it is the customary practice to add to the preparation a meat flavoring. Such flavoring may be in addition to any meat in the product. One method commonly practiced to obtain such meat flavoring is to cook meat bones, after the meat, fat, and the like, have been removed. As heretofore practiced this method has been conducted on a batch basis, has been relatively slow and expensive, has produced a relatively low yield, and the stock or flavoring produced has lacked uniformity and quality.

It is an object of the present invention to improve the method for producing meat flavored broth or stock from bones.

It is a further object to provide a method whereby such broth or stock can be produced from bones, especially beef bones, on a continuous basis.

A still further object is to provide such a method which can be performed in a reduced time cycle with greater yield and produce a more uniform and higher quality flavoring broth or stock.

These and other objects will be more apparent from the following description and the attached drawing showing a flow diagram of the instant invention.

In the process of the instant invention, after the removable meat, fat, and the like, have been removed from the bones, the bones are fed into an open kettle with sufficient water to cover the bones in the kettle. The water and bones are heated at atmospheric pressure to a temperature sufficient to liquefy the fat. During this heating, the liquefied fat rises to the surface of the water and is skimmed from the kettle and removed. After the fat is removed, the kettle is closed and pressurized or the bones and water are transferred to a pressure vessel. In the pressure vessel the water, which now contains materials extracted from the bones during the prior heating, and the ground bones are heated under pressure for not substantially less than 30 minutes and not substantially more than 45 minutes until the protein in the bones is hydrolyzed in the water and the resulting liquid has the desired color, clarity, flavor and other characteristics. The liquid, which may now be referred to as "stock," is then transferred to a storage tank and the bones are transferred to an open kettle. Fresh water is added to the open kettle in the weight ratio of not substantially less than 4 parts of water and not substantially more than 5 parts of water to 1 part of bones. The transferred bones and water are cooked for not substantially less than thirty minutes and not substantially more than sixty minutes at a temperature not substantially less than 200° F. and not substantially more than 210° F. and at atmospheric pressure. After cooking, the liquid which now contains extracted materials is separated from the spent bones. The separated liquid is transferred to stock storage tanks and the spent bones are removed and disposed of in the conventional manner.

The rate and degree of extraction in the instant process is dependent on the particle size of the bones. The larger the particles, the slower will be the rate of removal from the bones of fat and solids. The process may be carried out with whole bones. The yield of fat and solids is improved by grinding the bones. Breaking and grinding the bones to a size where all the bone particles pass through a screen having one-half inch openings is preferred. However, where lower yields of fat and stock are desired, the bones may be ground so that the particles pass through a screen having two inch openings.

The time required to liquefy and remove the fat from the bones, to a large extent, depends on the temperature employed. The fat may be separated from the bones at any temperature which will liquefy the fat. Temperatures between 170° and 210° F. are most effective. In practicing the process of the instant invention, it is preferred to heat the water and bones to a temperature between 200° and 210° F. and to maintain the water and bones at this temperature for about fifteen minutes. While the removal of fat continues after fifteen minutes, the additional amount of fat removed does not justify the prolonged heating.

The time and temperature required to produce stock of desired color, clarity, flavor, etc., depends on the degree of bone protein hydrolysis desired and the pressure employed. At fifty pounds pressure, a digestion time of approximately forty minutes at approximately 300° F. is preferred. The time may be reduced by employing temperatures which exceed 300° F. or may be increased with lower temperatures.

Preferably, the process of the instant invention is carried out in a continuous operation through a system of interconnected grinders, kettles and tanks at a controlled rate so that the bones and liquid are retained in each treatment zone for the prescribed times. A flow diagram of the continuous process is shown in the drawing.

Referring to the drawing, raw bones are fed at a controlled rate to a prebreaker and, from the prebreaker, to a disintegrator where the bones are ground. From the disintegrator, the ground bones are fed at a controlled rate into the precooker. The top of the precooker is open and, preferably, the outlet of the disintegrator is positioned above the precooker so that the ground raw bones may be fed into the top of the precooker by gravity.

The precooker tank is provided with a water inlet for fresh water, an overflow for the stock, and a skimmer for removing fat. The skimmer is positioned adjacent the surface of the liquid in the tank so that, as the fats rise to the surface, they may be skimmed from the surface and removed from the system. Preferably, the fresh water inlet is spaced from the stock overflow to avoid fresh water contamination of the overflowing stock. Likewise, the skimmer discharge is spaced from the stock overflow to avoid contamination of the overflowing stock with fat.

The precooker is provided with a conveyor which may be a screw or porous belt for moving the ground bone particles through the precooker tank. Preferably, the raw ground bones are discharged, by gravity, from the disintegrator onto one end of the conveyor which is positioned near the bottom of the tank in the liquid. The discharge of the conveyor is positioned above the liquid level for purposes which will be more apparent from the following description.

From the precooker tank, the ground bones are discharged from the end of the conveyor and are dropped, by gravity, into a worm conveyor. The worm conveyor passes the ground bones through the pressure extractor. After the bones pass through the pressure extractor, the worm conveyor discharges the bones into the atmospheric diffuser.

The atmospheric diffuser, like the precooker, is provided with a conveyor, which may be a screw conveyor or a porous belt. The top of the atmospheric diffuser is open so that the worm conveyor of the pressure extractor discharges the ground bones, by gravity, onto the conveyor of the atmospheric diffuser. For reasons more apparent hereinafter, the conveyor of the atmospheric diffuser is positioned so that the end of the conveyor receiving the ground bones from the extractor is located near the bottom of the tank in the liquid and the discharge end of the conveyor is located above the liquid level. The spent ground bones are discharged from the end of the conveyor and disposed of in the usual manner.

The continuous process of the instant invention preferably employs counterflow of the ground bones and the liquids and the liquid flow system is arranged so that when desired, all or portions of the liquid may be fed back into prior process steps to increase or control the ultimate concentration of the stock. In other words, the ground bone particles are moved through the various processing stages of the instant invention in one direction and the liquids are moved through the stages in the opposite direction.

As shown in the flow diagram of the drawing, fresh water is fed into the precooker at the end of the cooker where the precooked, ground bones are discharged. Preferably, the incoming fresh water is fed into the precooker so that it passes over the precooked ground bones just prior to the bone discharge from the precooker. The precooker liquid, which now contains some of the materials extracted from the ground bones, is discharged from the precooker at a point adjacent to the incoming raw ground bones. That is, of course, removed from the liquid prior to discharge.

The liquid discharged from the precooker is fed, under pressure, into the bone discharge end of the pressure extractor and is discharged from the pressure extractor at the end of the extractor into which the ground precooked bones are fed. Thus, in both the precooker and the pressure extractor, the liquid is moved through the system in a direction opposite to the direction of movement of the ground bones. From the pressure extractor, the liquid stock is discharged to stock storage tanks.

While a substantial amount of stock material is removed from the bones as the bones are treated in the pressure extractor, when discharged into the atmospheric diffuser the extracted ground bones still contain extractable material. To remove this material, fresh water is fed into the atmospheric diffuser at the end of the diffuser from which the spent bones are discharged and is fed through the diffuser in a direction opposite to that through which the bones are fed. Thus, the liquid which now contains stock material removed from the bones in the diffuser is withdrawn or discharged from the diffuser at the end of the diffuser where the ground bones enter. This liquid stock is fed to the stock storage tanks.

In the continuous process of the instant invention, the temperature in the various stages and the feed of the ground bones and liquid are controlled so that the temperature and the treatment time of the ground bones and the liquid are within the ranges prescribed above. If desired, the fresh water may be preheated before it is introduced into the system.

The stock discharged from the pressure extractor and the atmospheric diffuser may be withdrawn and stored separately or the two discharges may be mixed and stored together. Preferably, the discharges are mixed, centrifuged and stored together.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A process for extracting stock from bones the steps comprising, feeding bones and water to a container, liquefying the fat in said bones by heating said bones and said water in said container, removing said liquefied fat from said container, after said liquefied fat is removed, placing said container under pressure and heating the bones and liquid in said container until the protein in said bones hydrolyzes in said water and, when said water containing said hydrolyzed protein is at the desired color, clarity and flavor, releasing the pressure from said container, removing said water containing said hydrolyzed protein from said container, feeding fresh water to said container in a weight ratio of not substantially less than four parts of water and not substantially more than five parts of water to one part of bones, heating said bones and said fresh water for not substantially less than thirty minutes and not substantially more than sixty minutes at a temperature not substantially less than 200° F. and not substantially more than 210° F. and, thereafter, removing said bones and the resulting liquid from said container and separating said liquid from said bones.

2. A process as recited in claim 1 in which said pressure is about 50 p.s.i.

3. A process as recited in claim 2 in which said bones are ground to a particle size wherein substantially all of said particles will pass through a screen having two inch openings.

4. A process as recited in claim 2 in which said bones are ground to a particle size wherein substantially all of said particles will pass through a screen having one-half inch openings.

5. The process for extracting stock from bones the steps comprising, grinding said bones, feeding said ground bones and water to a container, heating said ground bones and said water for about fifteen minutes at a temperature not substantially less than 200° F. and not substantially more than 210° F., skimming fat from the heated liquid, after said fat has been skimmed, placing said ground bones and said liquid in said container under pressure and, while maintaining said ground bones and said liquid under pressure, heating said liquid and said ground bones for not substantially less than thirty minutes and not substantially more than forty-five minutes at a temperature of about 300° F., releasing the pressure from said container, removing said liquid from said container, feeding fresh water to said ground bones in said container in the ratio by weight of not substantially more than five parts of water and not less than four parts of water to one part of bones, heating said fresh water and said ground bones for not substantially less than thirty minutes and not substantially more than sixty minutes at a temperature not substantially less than 200° F. and not substantially more than 210° F. and, thereafter, removing said ground bones and the liquid from said container and separating said liquid from said ground bones.

6. A process as recited in claim 5 in which said pressure is about 50 p.s.i.

7. A process as recited in claim 6 in which said bones are ground to a particle size wherein substantially all of said particles will pass through a screen having one-half inch openings.

8. A process as recited in claim 6 in which said bones are ground to a particle size wherein substantially all of said particles will pass through a screen having two inch openings.

9. A process for extracting stock from bones the steps comprising, grinding said bones, feeding said ground bones to a first container, adding water to said container, heating said ground bones and said water in said first container for about fifteen minutes at a temperature not substantially less than 200° F. and not substantially more than 210° F., skimming and removing fat from the heated liquid, placing the remaining heated liquid and said ground bones in a closed container and, while maintaining said closed container under pressure, heating said liquid and said ground bones for not substantially less than thirty minutes and not substantially more than forty-five minutes at a temperature of about 300° F. and, thereafter, removing said liquid and said ground bones from said closed container, separating said liquid from said ground bones, placing said liquid in a storage tank, placing said ground bones in a second container, adding fresh water to said ground bones in said second container in the ratio by weight of not substantially more than five parts of water and not substantially less than four parts of water to one part of bones, heating said water and said ground bones in said second container for not substantially less than thirty minutes and not substantially more than sixty minutes at a temperature not substantially less than 200° F. and not substantially more than 210° F. and, thereafter, separating said ground bones from the liquid in said second container and placing said separated liquid in a storage tank.

10. A process as recited in claim 9 in which said pressure is about 50 p.s.i.

11. A process as recited in claim 10 in which said bones are ground to a particle size wherein substantially all of said particles will pass through a screen having one-half inch openings.

12. A process as recited in claim 10 in which said bones are ground to a particle size wherein substantially all of said particles will pass through a screen having two inch openings.

13. A continuous process for preparing stock from bones the steps comprising, grinding said bones, feeding said ground bones at a measured rate to a first container, adding water at a measured rate to said first container, heating said ground bones and said water in said first container for about fifteen minutes at a temeprature not substantially less than 200° F. and not substantially more than 210° F., skimming and removing fat from the heated liquid, feeding the remaining heated liquid and said ground bones to a closed container and, while maintaining said ground bones and said container under pressure in said closed container, heating said liquid and said ground bones for not substantially less than thirty minutes and not substantially more than forty-five minutes at a temperature of about 300° F., removing said liquid and said ground bones from said closed container, separating said liquid from said ground bones, feeding said liquid to a storage tank, placing said ground bones in a second container, feeding fresh water at a measured rate to said second container in the ratio by weight of not substantially more than five parts of water and not substantially less than four parts of water to one part of bones, heating said water and said ground bones in said second container for not substantially less than thirty minutes and not substantially more than sixty minutes at a temperature not substantially less than 200° F. and not substantially more than 210° F. and, thereafter, removing said liquid from said container and placing said separated liquid in a storage tank and removing said ground bones from said second container.

14. A continuous process as recited in claim 13 in which said pressure in said closed container is about 50 p.s.i.

15. A process as recited in claim 14 in which said bones are ground to a particle size wherein substantially all of said particles will pass through a screen having one-half inch openings.

16. A process as recited in claim 14 in which said bones are ground to a particle size wherein substantially all of said particles will pass through a screen having two inch openings.

References Cited
UNITED STATES PATENTS 2,622,027  12/1952  Torr _____ 99—7 X
2,953,456  9/1960  Mohler et al. _____ 99—14

OTHER REFERENCES

Binsted et al., "Soup Manufacture" 1940, published by Food Trade Press, Ltd. London, pp. 4 to 8, inclusive.

HYMAN LORD, *Primary Examiner.*